May 12, 1959  L. R. HETZLER  2,886,765
MAGNETIC AMPLIFIER VOLTAGE REGULATOR
Filed Oct. 20, 1955

INVENTOR
Lewis R. Hetzler
BY
R. E. Fowler
ATTORNEY

United States Patent Office 2,886,765
Patented May 12, 1959

2,886,765
MAGNETIC AMPLIFIER VOLTAGE REGULATOR

Lewis R. Hetzler, Rochester, Mich., assignor to General Motors Corporation, Detroit, Mich., a corporation of Delaware Application October 20, 1955, Serial No. 541,770

5 Claims. (Cl. 322—28)

This invention relates to voltage regulating means and more particularly to means for regulating the voltage supplied to a load from an alternating or direct current generating means whose speed of rotation may vary over a wide range. Vehicle electrical load requirements for normal operation are assuming larger and larger proportions. This is particularly true in coach and bus installations. Alternators, therefore, are being put into use to supply these heavy loads. The alternators are driven by the vehicle propelling means whose speed may vary widely during normal operation of the vehicle. This presents a very difficult voltage regulating problem. One regulating system which has been satisfactorily utilized is shown and described in my copending application Serial No. 509,347, filed May 18, 1955. That regulating system utilized magnetic amplifying means to control the generator field current and thus vary the voltage output. The present system is a modified form of the earlier one.

It is an object in making this invention to provide a voltage regulating system which utilizes no moving parts for use with a variable speed generator.

It is a further object in making this invention to provide a voltage regulating system utilizing magnetic amplifying means to regulate the generator field current and silicon diode means to control saturation of the magnetic amplifying means.

It is a still further object in making this invention to provide voltage regulating means utilizing magnetic amplifier means having no moving parts to reduce service and failure of such apparatus.

Figure 1:
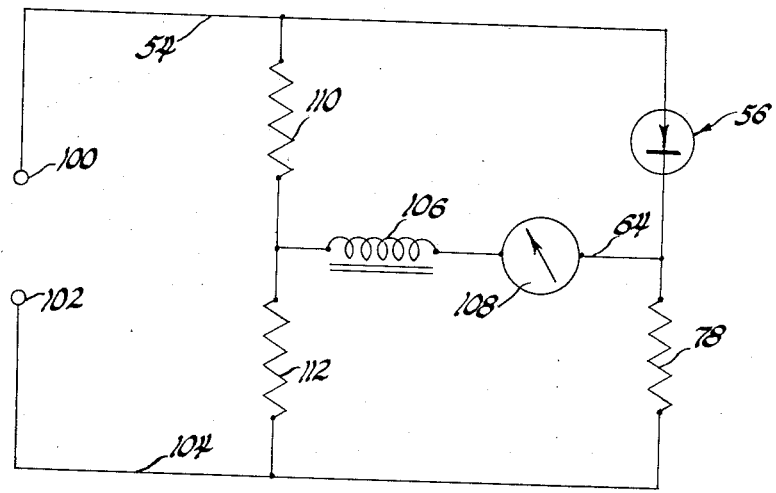
Figure 2:
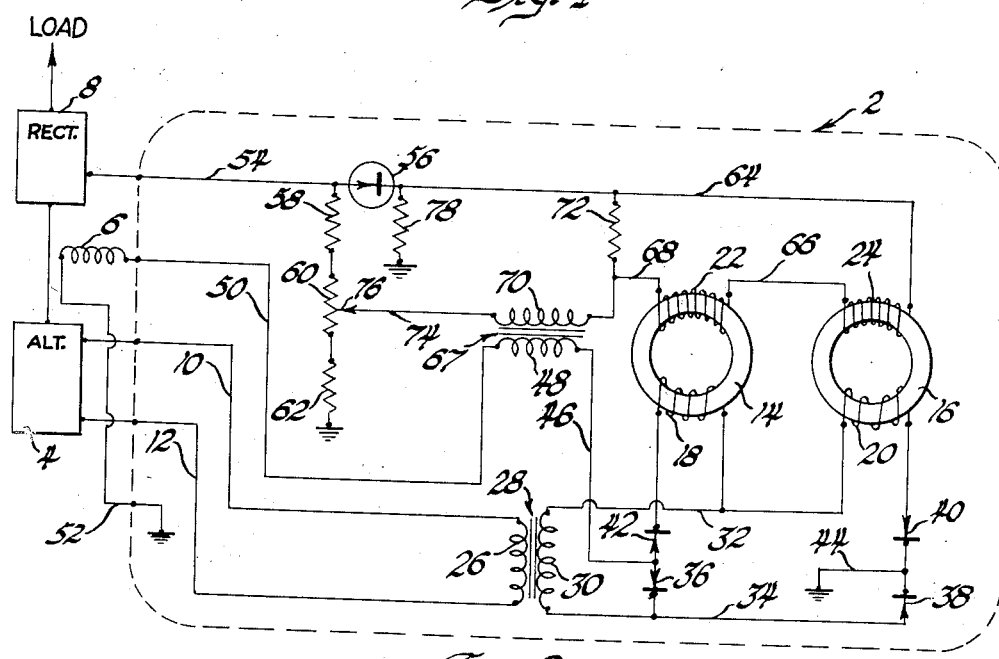

With these and other objects in view, the embodiments of my invention will be best understood by reference to the following description and claims and the illustrations of the accompanying drawings in which:

Figure 1 is a circuit diagram illustrating the principle of the bridge control circuit for the magnetic amplifying system; and Figure 2 is a combined block and circuit diagram of a voltage regulating system embodying my invention.

Basically, the electrical power supply system for a vehicle consists of a generator, the output of which may be controlled for providing ample power for the various requirements. When alternators are used, the power developed thereby is alternating current power. Since most of the electrical equipment on a vehicle utilizes direct current power, a power rectifier is provided to change the alternating current to direct current for application to the load. The variation in flow of current through the field winding of the alternator changes the magnetic flux varying in turn the amount of power generated by rotation of the rotor. Basically, then, the system under consideration includes an alternator having a field winding, a rectifier connected to the main alternator output converting the alternating current to direct current for application to the various loads and means for varying the flow of current through the field winding of the alternator which, in turn, adjusts the voltage of the output to maintain the same relatively constant. This system utilizes a portion of the alternating current output which is applied to a magnetic amplifier, rectified and applied to the field winding of the alternator to supply flux. Other windings on the magnetic amplifier vary the saturation of a common core, and, therefore, change the inductance of windings in series in the field current circuit to vary the same, depending upon the voltage of the alternator output. Thus, as the voltage tends to increase, the field current is diminished to cause the output voltage to decrease and therefore maintain it substantially constant.

Referring now more particularly to Figure 2, there is shown therein a voltage regulating unit 2 enclosed within the dashed outline. This regulating unit is shown connected to the block diagram representing the various basic components of the power supply system. As mentioned in general above, the system consists essentially of an alternator 4 having a field winding 6 for supplying a magnetic field for the generation of power. The alternating current output of the alternator 4 is applied to a rectifier 8 and thence connected to a load. The alternator also is shown as having a separate pair of lines 10 and 12 upon which alternating current generated by the unit may be taken off. The voltage regulator consists in the main of a magnetic amplifier which includes saturable cores 14 and 16 having wound thereon in spaced relation load windings 18 and 20 and control windings 22 and 24 respectively. If the alternator is single-phased, then the two supply lines 10 and 12 are connected directly across the output. If the alternator is three-phased, lines 10 and 12 may be connected across any one phase. They apply alternating current power to primary 26 of transformer 28.

The secondary 30 of the transformer 28 is connected directly through line 32 to one side of each of the load windings 18 and 20. The opposite side of the secondary 30 is connected through line 34 to one side of rectifiers 36 and 38. A further rectifier 40 is connected between the remaining terminal of load winding 20 and the other terminal of rectifier 38 and is in opposite phase. In like manner, the rectifier 42 is connected between the remaining terminal of load winding 18 on core 14 and the other terminal of rectifier 36 and is likewise in opposite phase to that rectifier. The intermediate point between rectifiers 38 and 40 is grounded through line 44. The intermediate point between rectifiers 42 and 36 is connected through line 46 to one terminal of primary 48 of transformer 67. The opposite terminal of the primary is connected through line 50 to the field 6 of the alternator. The field 6 is also connected to ground through line 52.

Thus, the alternating current power generated by the alternator 4 is applied to the bridge rectification system including load coils 18 and 20 and rectifiers 36, 38 and 42 and 40. The output of the rectifier bridge is direct current which is applied through winding 48 to the field 6. Thus, the alternating current power from the alternator itself is converted to direct current and supplied to the field winding to create the alternator magnetic field. The magnitude of the current flowing through this system for an applied voltage is determined by the inductance of load coils 18 and 20 and, if this inductance is varied, the amount of current flowing in this system will vary.

This regulation is applied through the so-called control coils 22 and 24 also mounted on cores 14 and 16. The regulating power is supplied from the rectifier 8 and is direct current voltage. Rectifier 8 is, therefore, connected through line 54 to one terminal of a silicon diode 56 and also to one terminal of a plurality of resistances 58, 60 and 62 which are connected in series between the line 54 and ground. The opposite terminal of the silicon diode 56 is connected through line 64 to one terminal of control winding 24. Line 66 connects winding 24 with winding 22. Line 68 is connected to the remaining terminal of control winding 22 and also to one terminal of secondary 70 of transformer 67. A resistor 72 is connected between lines 64 and 68. The remaining terminal of secondary 70 is connected through line 74 with a variable tap 76 movable over the surface of resistor 60. A final resistor 78 is connected between line 64 and ground.

This last portion of the system to be described may be termed the voltage sensing system and is designed to vary and reverse polarity of the voltage applied to the control windings at a particular line voltage. Figure 1 shows basically how this particular portion operates. The parts shown in Figure 1 are exemplary of the parts used in Figure 2. The voltage to be regulated is applied across two terminals 100 and 102. In Figure 1 this voltage would be the voltage on line 54. Line 54 is connected to the silicon diode 56, the opposite side of which is connected through a resistance such as 78 to line 104. From a point intermediate the silicon diode 56 and the resistance 78 a line 64 is connected to the control winding 106 which is illustrative of the two windings 22 and 24 in Figure 2. A meter 108 is shown in this connection to demonstrate a reversal of current flow through said control winding 106 under certain specific circumstances. Two resistances 110 and 112 are serially connected between line 54 and line 104. These correspond to the three resistances 58, 60 and 62 of Fig. 2. The opposite terminal of the control winding 106 is connected to a point intermediate the two resistances 110 and 112.

From this circuit it will be seen that the bridge consists of three legs including resistances 110, 112 and 78, the fourth leg of the bridge comprising the silicon diode 56. The voltage of the system is, therefore, connected directly across the bridge between lines 54 and 104. This voltage in general may be assumed to be in reverse polarity to that of the diode 56 so that the latter will not conduct. Variation from the required voltage of the system is sensed as a current across the bridge flowing through the meter 108 and the control coil 106. As long as the voltage does not rise above the rated back voltage of the diode which is of the so-called Zener variety, such as is described in Patent No. 2,655,608, issued October 13, 1953, to L. B. Valdes, very little current will flow in a given direction in the control circuit. Zener diodes have the very advantageous characteristic of acting as a very high resistance until the back or opposite voltage for which they were designed is exceeded and then very rapidly changing their resistance characteristics so that a small voltage change will introduce a relatively large current change as the voltage is then further increased. Likewise, as the voltage is reduced, the diode regains control and is not damaged by excess reverse voltage. The bridge is so balanced that at applied voltages less than that to which it is desired to regulate and which are normally above the Zener voltage, a small current flows through winding 106. As the line voltage increases, however, and approaches the desired limit voltage, the resistance of the diode drops and at some given value the bridge circuit will be balanced and no current will flow through the control winding. A further rise of voltage then causes the current to change direction in said winding and increase appreciably. Thus it can be seen that the diode is operated on the flat portion of its characteristic curve so that a small voltage change produces a maximum current change. This will change the saturation in any cores around which the control winding may be mounted, which would tend to increase the inductance of the load coils and cut down the field current so that the generator will reduce its output voltage. As the voltage drops again below the point at which the bridge circuit just shown balances, this opposing flux will be reduced permitting the inductance of the load coils to be reduced and increase the field current so that the generator will raise its output voltage.

Applying the principles illustrated in Fig. 1 to this specific design of Fig. 2, it will be obvious that the bridge is substantially the same as that shown in Fig. 1. One side of the bridge consists of resistances 58, 60 and 62 but the system has been so designed that the movement of point 76 over resistance 60 can adjust the respective resistances in these two legs. The other half of the bridges includes, as before, silicon diode 56 and resistance 78. The cross connection includes control windings 22, 24 and transformer secondary 70. Thus, the direction of flow through this circuit will determine the saturation of the control cores 14 and 16. As long as the voltage on line 54 from the rectified output does not exceed the breakdown or Zener voltage of silicon diode 56, a small amount of current may flow through the control windings 22 and 24. When, however, the voltage on line 54 approaches the breakdown voltage of the Zener diode, the amount of current flowing in this cross connection will be reduced, balanced, and at a critical voltage, i.e., that which it is desired to maintain, will reverse. This reversal immediately applies a damping or opposing effect in the form of a change in the inductance in the load coils 18 and 20 to reduce the field current. The diode 56 has the extremely useful characteristics of, at this point, varying its resistances appreciably for a very small change in applied voltage. Movement of the tap 76 on the resistance 60 can adjust the bridge for normal usage. It will be seen that in this system there are no moving parts, no points to burn, or contacts to become loose, etc.

The transformer consisting of primary 48 and secondary 70 is utilized in this system for stabilizing purposes. In the previous system shown in S.N. 509,347, in order to prevent unstable action in such a system, an inductor was introduced into the line between the two control windings such as 22 and 24. It was further utilized to dampen the second harmonic currents. While such inductors do provide smoother control, they have the disadvantage of aggravating hunting. In order to eliminate this inductance and its disadvantage, I have incorporated in the circuit between control winding 22 and adjustable tap 76 a feed-back transformer 67. The suppression of the second harmonic current in this control circuit is now achieved by bucking any voltage attributable to this current with an opposite voltage. This bucking voltage is obtained from the magnetic amplifier through the primary 48 from the load windings 18 and 20. The current in this portion of the circuit is rich with second harmonic components. Therefore, the second harmonic flowing from the primary winding 48 introduces second harmonic components into the secondary 70 which opposes the control winding voltage. This suppresses the flow of such currents in the control winding circuit and stabilizes the operation without introducing additional inductance which might aggravate hunting. This second harmonic feed-back, if carefully controlled, can also have a beneficial effect in providing better regulation in applying a certain amount of feed-back to the control windings. This system also has the advantage that it utilizes the alternating current power directly from the alternator to supply the field current and, therefore, any change in the direct current loading will provide more voltage for the field power and better regulation.

I claim:

1. Power supply means including an electrical generating means having a field winding, an output line connected to said generator and upon which a supply voltage appears that it is desired to regulate, inductive means connected between the generator output and the field winding, saturated core means upon which the inductive means is mounted, control winding means on said core means to vary the saturation of said core means, balanced bridge means connected to the output line including in one branch a silicon diode which will conduct in the reverse direction upon application of voltage greater than a given value, said other branches being formed of fixed impedances, and feedback means connected in series with the control winding means and with the induction means to provide stabilization.

2. Voltage regulating means comprising an inductance means which is adapted to be connected into a power supply system, means for changing the value of said inductance including saturable core means associated with said inductance means, control winding means on said saturable core means, a balanced bridge circuit having in one branch a diode which has a non-linear conductivity relation above an excess back voltage, means to connect the control winding means across the bridge circuit and sensitive to unbalance current flow therethrough, feedback means interconnecting the inductance means and the control winding means for stabilization and means for adjusting the bridge circuit for balance.

3. In a voltage supply system, an alternator, a field winding for the same, a power rectifier connected to said alternator, a direct current power line connected to said rectifier to supply desired loads, load inductance means connected between the alternator and field winding to control the flow of current, saturable core means upon which the inductance means is mounted, control winding means mounted on said core means, a balanced bridge circuit consisting of a plurality of impedance means and a diode having a back voltage breakdown point at which the effective resistance varies rapidly, said balanced bridge circuit being connected to said power line, means connecting said control winding means across the bridge so that current flow therethrough will be controlled by bridge unbalance, means to adjust the bridge balance, and feedback means between the load inductance means and the control winding means to stabilize the system.

4. In a voltage supply system, a generator, a field winding for the same, an output line connected to the generator upon which it is desired to maintain a substantially constant voltage, load inductance means connected to the output line of the generator and to the field, the variation in the value of the load inductance means changing the current flow through said field, saturable core means upon which the load inductance means is mounted, control winding means mounted on said saturable core means to control the saturation of the saturable core means, a balanced bridge circuit consisting of a plurality of impedance means and a diode having a back voltage breakdown point at which the effective resistance varies rapidly, said balanced bridge circuit being connected across the output of the generator and said control winding means being connected across said balanced bridge circuit and a coupling transformer connected in circuit with the field winding and the control winding means to provide feedback from the load inductance means to the control winding means for stabilization.

5. In a voltage supply system, a generator, a field winding for the same, an output circuit connected to the generator upon which it is desired to maintain a substantially constant voltage, load inductance means connected to the output circuit of the generator and to the field, the variation in the value of the load inductance means changing the current flow through said field, saturable core means upon which the load inductance means is mounted, control winding means mounted on said saturable core means to control the saturation of the saturable core means, a balanced bridge circuit consisting of a plurality of impedance means in one leg and a Zener diode and impedance in the other leg, said balanced bridge circuit being connected across the output circuit of the generator and said control winding means being connected across said balanced bridge circuit and a coupling transformer connected in circuit with the field winding and the control winding means to provide feedback from the load inductance means to the control winding means for stabilization.

References Cited in the file of this patent

UNITED STATES PATENTS

| | | |
|---|---|---|
| 2,456,938 | Harder | Dec. 21, 1948 |
| 2,518,865 | Cartotto | Aug. 15, 1950 |
| 2,650,341 | Jones | Aug. 25, 1953 |
| 2,714,702 | Shockley | Aug. 2, 1955 |
| 2,724,797 | Storm | Nov. 22, 1955 |
| 2,748,340 | Brunner et al. | May 29, 1956 |